Patented Nov. 24, 1936

2,062,075

UNITED STATES PATENT OFFICE 2,062,075

PROCESS OF TREATING BEER AND ALE

Leo Wallerstein, New York, N. Y.

No Drawing. Application November 10, 1934,
Serial No. 752,475

2 Claims. (Cl. 99—48)

This invention relates to an improvement in the preparation of beers and ales, the term beers and ales herein being used in their usual acceptation.

In my prior application Serial No. 268,083, filed April 6, 1928, and Serial No. 652,198, filed January 17, 1933, Patent No. 1,994,494, issued March 19, 1935, which was filed in Canada January 18, 1932, I have described the treatment of malt beverages with activated carbon, and the present application is a continuation in part of said applications.

It has been found that certain tastes, odors, and flavors occasionally arise in fermented wort or in fermented malt beverages, and considerable difficulty has been encountered in removing said tastes, odors and flavors without disadvantageously affecting the quality of the malt beverage.

After considerable experimentation it has been found that some of the most objectionable of these tastes, flavors and odors are caused by bacterial infection, for instance, as by the growth and propagation of sarcina.

The removal of these undesirable substances from the wort after fermentation represents a substantial problem which has not been susceptible to ready solution. Although both ordinary charcoal and so-called activated carbons have been widely utilized in removing undesirable flavors, odors and colors from various liquids, they have never been commercially used in connection with fermented worts and with beer or ale. Absorbent and activated carbons take up odors, flavors and colors from liquids rather indiscriminately regardless of whether such flavors, odors and colors are desirable or undesirable.

It is therefore evident that in the case of fermented wort, which contains many times the amount of desirable flavors and tastes as undesirable flavors and tastes, it would be expected that the use of absorbent carbons would result in a greater decrease in desirable substances than in the undesirable substances which are to be removed and in the case of ordinary absorbent carbon, such effect is experienced.

I have now most surprisingly discovered that a specific treatment of the fermented wort or beer, which is affected with undesirable flavors, odors, due to the development of undesirable bacteria, such as sarcina, with relatively minute quantities of certain types of activated carbon and at certain pH values and temperatures will exercise most unexpectedly a selective action and will substantially remove these undesirable flavors, tastes and odors without removing the desirable characteristic odors and tastes of the fermented wort, such as beer or ale.

In order to achieve this end of removing these undesirable tastes and flavors it has been found preferable to utilize an activated charcoal of such strength that a gram thereof will absorb and decolorize 500 to 600 c. c. of methylene blue solution of the strength of 1 to 4,000. The best activated carbons for the purpose of the present invention are those which are produced by treating charcoal with superheated steam or by charring wood in the presence of activating substances, such as zinc chloride.

It has also been found that pH of fermented wort during this process should be controlled to be between 4.0 and 5.0.

In carrying out the process of the present invention, I have found that an activated charcoal, as above referred to, used in quantities preferably not more than 10 ounces and more desirably about ½ to 5 ounces per barrel of thirty-one gallons of fermented wort will produce most satisfactory results. This activated charcoal may be mixed or diluted with inert filler materials, such as kieselguhr, other porous substances, and so forth.

Such treatment preferably may be continued for 5 to 10 minutes and need not be continued beyond 30 minutes. The treatment is preferably carried out at temperatures ranging from 0° to 15° C.

After the fermented wort has been subjected to the action of the activated carbon, as described, the carbon may be removed by filtration, decantation or any other suitable manner.

For example, with 0.25 to 0.50 gram of activated char of the activity specified above per liter, it was found that the beer or ale flavor was retained and the undesirable flavor was substantially completely removed.

With 2½ grams of ordinary absorbent char or wood charcoal per liter on the other hand (about 10 ounces to the barrel), the undesirable flavors will be substantially unaffected, while 5 to 10 grams of wood charcoal per liter (about 20 to 40 ounces per barrel) will remove the undesirable flavor but will also remove substantially desirable flavors. Many other changes could be effected in the particular features of process treatment disclosed, and in specific details thereof, without substantially departing from the invention intended to be defined in the claims, the specific description herein merely serving to illustrate certain elements by which, in one embodiment, the spirit of the invention may be effectuated.

What is claimed is:

1. In a process of producing beers and ales to remove tastes caused by bacterial infection and by the growth and propagation of sarcina, the step of treating the beers and ales after substantial alcoholic fermentation with a minute quantity of activated carbon at a temperature of 0 to 15° C., one gram of which is capable of decolorizing 500 to 600 c. c. of methylene blue solution of a strength of 1 to 4,000, in the proportion of one-half to five ounces of the activated carbon to each barrel of thirty-one gallons, said wort having a pH of 4 to 5, for less than thirty minutes, said treatment exerting a selective action in removing said tastes, without substantially removing any of the desirable characteristic odors and tastes of the beers and ales.

2. In a process of producing beers and ales to remove tastes caused by bacterial infection and by the growth and propagation of sarcina, the step of treating the beers and ales after substantial alcoholic fermentation at a temperature of 0 to 15° C. with a minute quantity of activated carbon, one gram of which is capable of decolorizing 500 to 600 c. c. of methylene blue solution of a strength of 1 to 4,000, in the proportion of one-half to twenty ounces of the activated carbon to each barrel of thirty-one gallons, said wort having a pH of 4 to 5, said treatment exerting a selective action in removing said tastes, without substantially removing any of the desirable characterstc odors and tastes of the beers and ales.

LEO WALLERSTEIN.